US009001295B2

(12) United States Patent
Shibazaki et al.

(10) Patent No.: US 9,001,295 B2
(45) Date of Patent: Apr. 7, 2015

(54) LIQUID CRYSTAL DISPLAY DEVICE

(75) Inventors: Akira Shibazaki, Osaka (JP); Ken Kuboki, Osaka (JP); Satomi Hasegawa, Osaka (JP); Hiroshi Tsuchiya, Osaka (JP); Yusuke Nishihara, Osaka (JP); Taichi Sasaki, Osaka (JP); Seiji Tanuma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 13/980,787

(22) PCT Filed: Jan. 16, 2012

(86) PCT No.: PCT/JP2012/050695
§ 371 (c)(1),
(2), (4) Date: Jul. 19, 2013

(87) PCT Pub. No.: WO2012/099047
PCT Pub. Date: Jul. 26, 2012

(65) Prior Publication Data
US 2013/0293815 A1    Nov. 7, 2013

(30) Foreign Application Priority Data

Jan. 20, 2011   (JP) ................. 2011-009986

(51) Int. Cl.
*G02F 1/1337*   (2006.01)
*G02F 1/1343*   (2006.01)

(52) U.S. Cl.
CPC ........ *G02F 1/133753* (2013.01); *G02F 1/1337* (2013.01); *G02F 1/1343* (2013.01)

(58) Field of Classification Search
CPC .......... G02F 1/33707; G02F 1/133753; G02F 1/133788; G02F 1/1337; G02F 1/1343; G02F 1/133723; G02F 1/1333; G02F 2001/134345; G02F 2001/133757; G02F 2001/133761; G02F 2201/123; G02F 2201/40; G02F 2201/122; G02F 2201/128; G09G 2300/0447; G09G 2300/0443; G09G 2300/0439; G09G 2320/028; G09G 3/3648
USPC ............ 349/123, 139, 96, 128, 143, 144, 129
See application file for complete search history.

(56) References Cited

U.S. PATENT DOCUMENTS

| 2003/0071952 A1 | 4/2003 | Yoshida et al. |
| 2005/0200789 A1* | 9/2005 | Nakanishi ................ 349/139 |
| 2009/0244462 A1 | 10/2009 | Tsubata |

FOREIGN PATENT DOCUMENTS

| JP | 2007-249243 A | 9/2007 |
| JP | 2008-097049 A | 4/2008 |
| JP | 2008-197691 A | 8/2008 |
| WO | 2008007583 A1 | 1/2008 |

OTHER PUBLICATIONS

International Search Report corresponding to PCT/JP2012/050695, dated Feb. 7, 2012.

* cited by examiner

*Primary Examiner* — Thoi Duong
(74) *Attorney, Agent, or Firm* — Lowe Hauptman & Ham, LLP

(57) ABSTRACT

A liquid crystal display device includes: a liquid crystal layer extending at least in a display region; first and second substrates affixed to each other so as to sandwich the liquid crystal layer therebetween; and a pair of polarization plates disposed to sandwich these substrates therebetween. The first substrate is provided with a pixel electrode corresponding to each of a plurality of pixels. The second substrate is provided with a counter electrode so as to face the pixel electrode. A first alignment film is disposed on the pixel electrode. A second alignment film is disposed on the counter electrode. The pixels each include a plurality of domains having different combinations of alignment directions of the first and second alignment films. The pixel electrode has a slit group along at least a part of an outline of the pixel electrode and in the vicinity of the outline.

5 Claims, 16 Drawing Sheets

NO SLIT GROUP $\theta = 45°$ $\theta = 90°$

L=12 μm

L=16 μm

L=20 μm

LIQUID CRYSTAL DISPLAY DEVICE

RELATED APPLICATIONS

This application is a National Stage of International Application Number PCT/JP2012/050695 filed on Jan. 16, 2012, and which is based upon and claims the benefit of priority from Japanese Patent Applications No. 2011-009986, filed on Jan. 20, 2011.

TECHNICAL FIELD

The present invention relates to a liquid crystal display device, and particularly to a liquid crystal display device in which a plurality of domains are formed in one pixel.

BACKGROUND ART

Various types of liquid crystal display devices have been conventionally proposed. Particularly recently, there have been proposed various types of liquid crystal display devices aiming at a widened viewing angle, suppressed disclination, reduced burn-in, and the like. For the purpose of widening the viewing angle, an MVA (Multidomain Vertical Alignment) scheme for forming a plurality of domains in one pixel is proposed.

For example, Japanese Patent Laying-Open No. 2007-249243 (PTD 1) discloses an example of a liquid crystal display device based on the MVA scheme. The MVA liquid crystal display device disclosed in PTD 1 includes a pair of substrates, a plurality of domains formed in one pixel, and domain limitation means for limiting the tilting direction of the liquid crystal molecules in each domain. As domain limitation means, PTD 1 discloses a protrusion and a depression formed on the surface of the substrate, and an electrode formed in the shape of a fishbone and provided in the substrate.

Such domain limitation means is provided, so that the domains are different from each other in terms of the direction in which liquid crystal molecules are tilted in each domain during voltage application. The liquid crystal molecules are tilted in different directions in the domains in this way, thereby allowing improvement in a viewing angle.

The liquid crystal display device disclosed in Japanese Patent Laying-Open No. 2008-197691 (PTD 2) includes a domain formed in one pixel, and a vertical alignment film provided in a portion in contact with a liquid crystal layer. The vertical alignment film is irradiated with ultraviolet (UV) light in an oblique direction, and thereby, subjected to an alignment process. The direction of irradiation of UV light is changed depending on positions, which leads to formation of a plurality of domains. This liquid crystal display device includes a structure having a protruded shape such that liquid crystal molecules are oriented in the alignment limiting direction in each domain during voltage application.

CITATION LIST

Patent Document

PTD 1: Japanese Patent Laying-Open No. 2007-249243
PTD 2: Japanese Patent Laying-Open No. 2008-197691

SUMMARY OF INVENTION

Technical Problem

In a liquid crystal display device including a plurality of domains in which liquid crystal molecules are oriented in different directions during voltage application, a dark line occurs on a part of the outline of a pixel.

Accordingly, an object of the present invention is to provide a liquid crystal display device including a plurality of domains for which the phenomenon where a dark line occurs on a part of the outline of a pixel is suppressed.

Solution to Problem

In order to achieve the above-described object, the liquid crystal display device based on the present invention has a display region including a plurality of pixels and includes: a liquid crystal layer extending at least in the display region; first and second substrates affixed to each other so as to sandwich the liquid crystal layer therebetween; and a pair of polarization plates disposed so as to sandwich the first and second substrates therebetween. The first substrate is provided with a pixel electrode corresponding to each of the plurality of pixels. The second substrate is provided with a counter electrode so as to face the pixel electrode. A first alignment film is disposed on a surface of the pixel electrode, the surface being a surface facing the liquid crystal layer. A second alignment film is disposed on a surface of the counter electrode, the surface being a surface facing the liquid crystal layer. The pixels each include a plurality of domains having different combinations of alignment directions of the first and second alignment films. The pixel electrode has a slit group along at least a part of an outline of the pixel electrode and in the vicinity of the outline.

Advantageous Effects of Invention

According to the present invention, the phenomenon where a dark line occurs on a part of the outline of a pixel can be suppressed.

DESCRIPTION OF EMBODIMENTS

First described will be the reason why the above-mentioned dark line occurs.

Figure 1:
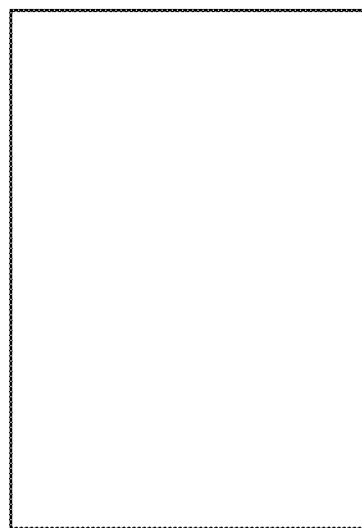
FIG. 1 is a plan view of a pixel electrode.

In the liquid crystal display device having a plurality of domains, the posture of a liquid crystal molecule is set for each domain. The substrates sandwiching the liquid crystal layer will be referred to as TFT (Thin Film Transistor) substrate and CF (Color Filter) substrate. On a surface of the TFT substrate, a pixel electrode of the shape shown in FIG. 1 is provided. For each domain, the TFT substrate and the CF substrate each have an alignment film. These alignment films have respective alignment directions set differently from each other. Among liquid crystal molecules within each domain, liquid crystal molecules located near the alignment film of the TFT substrate and the alignment film of the CF substrate are tilted in accordance with the alignment direction of each alignment film.

In addition, the angle formed by the longitudinal direction of the liquid crystal molecule and the substrate surface will be referred to as "tilt angle." The direction in which the liquid crystal molecule is tilted as seen from the direction perpendicular to the substrate will be referred to as "tilt direction." The tilt angle and the tilt direction in the state where the pixel electrode is not applied with a voltage will be referred to as "pre-tilt angle" and "pre-tilt direction," respectively.

As the distance from the alignment film is increased along the thickness direction of the liquid crystal layer, the posture of liquid crystal molecules is less influenced by the alignment film. Particularly when the alignment direction of the alignment film of the TFT substrate is different from the alignment direction of the alignment film of the CF substrate, the tilt direction of the liquid crystal molecules is to change along the thickness direction. In a central region of the liquid crystal layer in the thickness direction, the liquid crystal molecules are tilted in the tilt direction that corresponds to an average direction of the tilt direction determined by the alignment film of the TFT substrate and the tilt direction determined by the alignment film of the CF substrate.

On the other hand, near the outline of the pixel, each liquid crystal molecule tends to be tilted in the direction perpendicular to the outline of the pixel and in the inward direction relative to the outline thereof, due to the influence of the oblique electric field caused by the edge of the pixel electrode.

Figure 2:
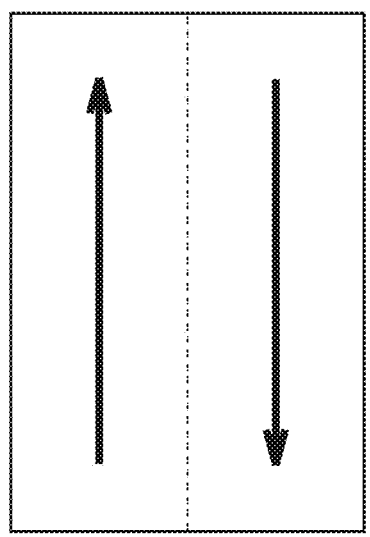
FIG. 2 is an explanatory diagram of exposure setting on a TFT substrate.
Figure 3:
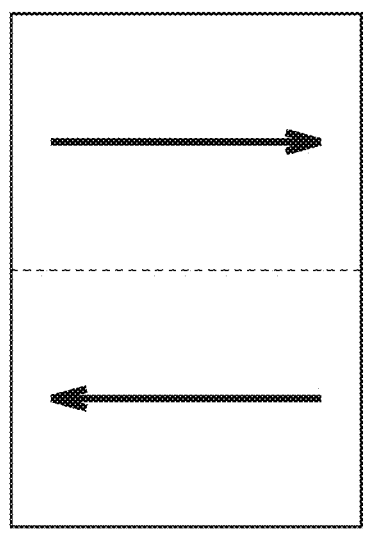
FIG. 3 is an explanatory diagram of exposure setting on a CF substrate.

A further detailed explanation will be given about an example as to how the tilt direction of the liquid crystal molecule in each pixel is determined. In each pixel, a pixel electrode having the shape shown in FIG. 1 is provided on the TFT substrate side. Although many pixels are actually arranged on the substrate, the following explanation will be focused on the state in one pixel. In this example, on the TFT substrate, each pixel is divided into two regions on the right and left sides as shown in FIG. 2, and the alignment film is to be exposed to light in the direction set for each region. On the CF substrate, each pixel is divided into two regions on the upper and lower sides as shown in FIG. 3, and the alignment film is to be exposed to light in the direction set for each region. Arrows in FIGS. 2 and 3 each indicate the direction of light irradiation during exposure.

Figure 4:
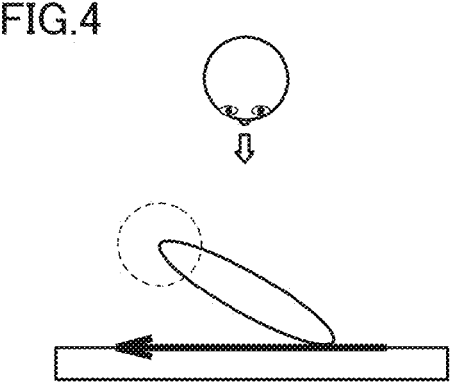
FIG. 4 is an explanatory diagram showing the state of viewing the posture of a liquid crystal molecule on the TFT substrate.
Figure 5:
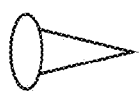
FIG. 5 shows a symbol indicating a tilt direction of the liquid crystal molecule.

The tilt of the liquid crystal molecule will be hereinafter explained using a symbol. For example, in the state where the alignment direction is set leftward as shown by an arrow in FIG. 4 on the upper surface of the substrate and the liquid crystal molecule tilts accordingly, if this liquid crystal molecule is seen from above the substrate, the left end of the liquid crystal molecule in FIG. 4 is seen relatively closer to a viewer. Accordingly, this left end is shown as a head having an elliptical shape. Also, since the right end of the liquid crystal molecule in FIG. 4 is seen relatively further away from the viewer, this end is shown as a sharp tail. As a result, the state of the liquid crystal molecule corresponding to that in FIG. 4 is shown in a shape of a tadpole as in FIG. 5. The tilt direction of the liquid crystal molecule can be identified by the direction of the tadpole-shaped head.

Figure 6:
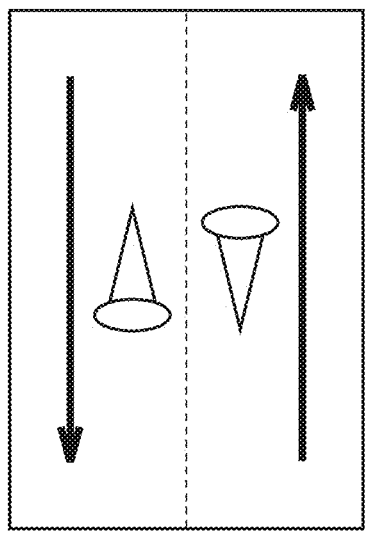
FIG. 6 is an explanatory diagram of the alignment direction set on the TFT substrate.
Figure 7:
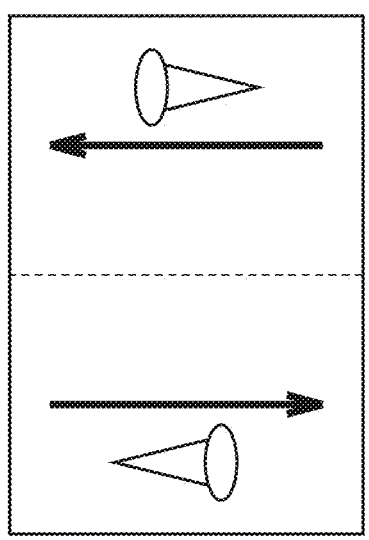
FIG. 7 is an explanatory diagram of the alignment direction set on the CF substrate.

By exposing the alignment film to light from a fixed tilted direction, this alignment film is set in a fixed alignment direction. The alignment direction is opposite to the exposure direction. As shown in FIG. 2, as a result of exposing the TFT substrate to light, the alignment film on the surface of the TFT substrate is set in the alignment direction as shown in FIG. 6. As a result of exposing the CF substrate to light as shown in FIG. 3, the alignment film on the surface of the CF substrate is set in the alignment direction as shown in FIG. 7. The arrows in FIGS. 6 and 7 each indicate the alignment direction that has been set, and mean that the alignment film has a characteristic of causing liquid crystal molecules near the alignment film to be tilted in this direction.

Figure 8:
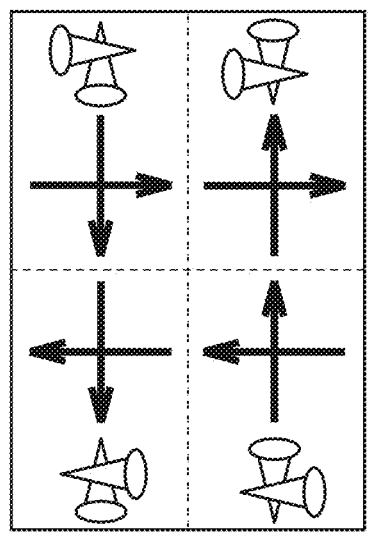
FIG. 8 is an explanatory diagram of a plurality of domains produced in an area obtained by affixing the TFT substrate and the CF substrate.
Figure 9:
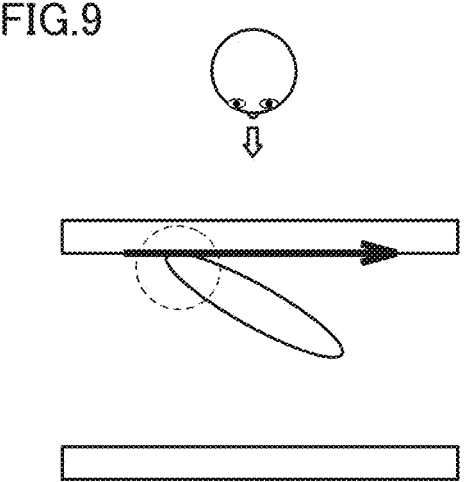
FIG. 9 is an explanatory diagram showing the state of viewing the posture of the liquid crystal molecule in the area obtained by affixing the TFT substrate and the CF substrate.

It is assumed that the CF substrate shown in FIG. 7 is turned over horizontally such that the positions of the right and left sides are reversed, and then overlaid on the TFT substrate shown in FIG. 6 such that its alignment film is located inside, thereby holding the liquid crystal layer between the TFT substrate and the CF substrate. In this way, four domains are formed in one pixel as shown in FIG. 8. The arrow indicating the upward or downward direction in FIG. 8 shows an alignment direction of the alignment film formed on the upper surface of the TFT substrate. The arrow indicating the rightward or leftward direction in FIG. 8 shows an alignment direction of the alignment film formed on the lower surface of the CF substrate. The liquid crystal molecule that is tilted by the alignment film on the lower surface of the CF substrate is seen from the viewer through the CF substrate as shown in FIG. 9. Since the end of the liquid crystal molecule on the CF substrate side is relatively closer to the viewer, this end is shown as a head of the tadpole shape.

FIG. 8 shows that two tadpole shapes each indicating a liquid crystal molecule overlap each other in each domain, in which the tadpole shape located on the front surface side of the plane of FIG. 8 indicates the tilt direction of the liquid crystal molecule near the CF substrate while the tadpole shape located behind the above-mentioned liquid crystal molecule indicates the tilt direction of the liquid crystal molecule near the TFT substrate. In each domain, the tilt direction of the liquid crystal molecule near the TFT substrate and the tilt direction of the liquid crystal molecule near the CF substrate cross each other at right angles.

Figure 10:
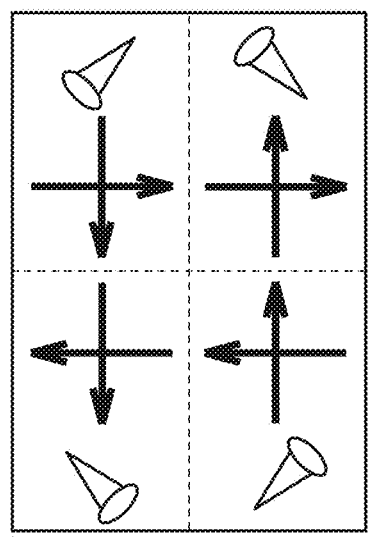
FIG. 10 is an explanatory diagram showing the tilt direction of the liquid crystal molecule in a central region in the thickness direction within each domain.
Figure 11:
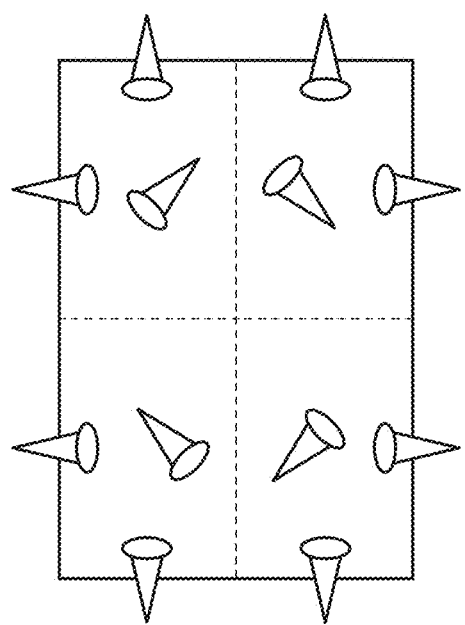
FIG. 11 is an explanatory diagram showing the tilt direction of the liquid crystal molecule in a central region in the thickness direction within each domain, as well as the state where liquid crystal molecules in the vicinity of the outline of a pixel electrode are tilted due to an oblique electric field.
Figure 12:
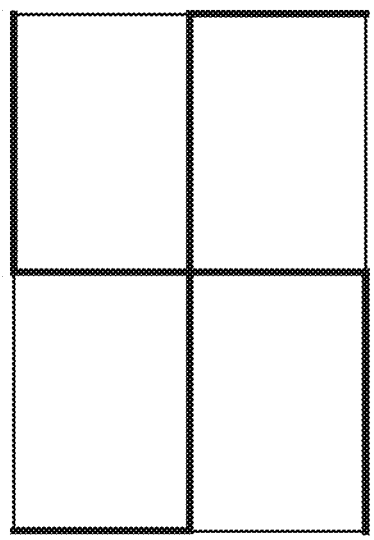
FIG. 12 is an explanatory diagram showing the state where a dark line occurs in one pixel.

In the center of the liquid crystal layer in the thickness direction, since the liquid crystal molecule is tilted in the direction obtained by combining two tilt directions shown in FIG. 8, the tilt direction of the liquid crystal molecule in the center in the thickness direction in each domain is as shown in FIG. 10. When a voltage is applied, an oblique electric field is generated near the outline of the pixel electrode provided on the TFT substrate, which is as shown in FIG. 11. In other words, the liquid crystal molecule located near the outline of the pixel electrode tends to tilt so as to be perpendicular to the outline due to the influence of the oblique electric field. FIG. 11 shows tilted liquid crystal molecules on the outline of the pixel electrode. The side of the outline of each domain shown in FIG. 11 that also forms a part of the outline of the pixel will be referred to as "domain side." One pixel can be assumed to have eight domain sides. Each side of the pixel is formed of two domain sides. On the domain side in which the heads of the symbols of the liquid crystal molecules face each other, the direction of liquid crystal molecules is disrupted to produce a dark line. Furthermore, also in the portion where domains are adjacent to each other, the tilt angles of the liquid crystal molecules differ from each other by 90°, which leads to formation of a dark line. Consequently, as shown in FIG. 12, dark lines appear in the boundary between the domains and in four domain sides on the outline of the pixel. As one entire pixel, a dark line appears in the shape of a hooked cross (swastika).

Figure 13:
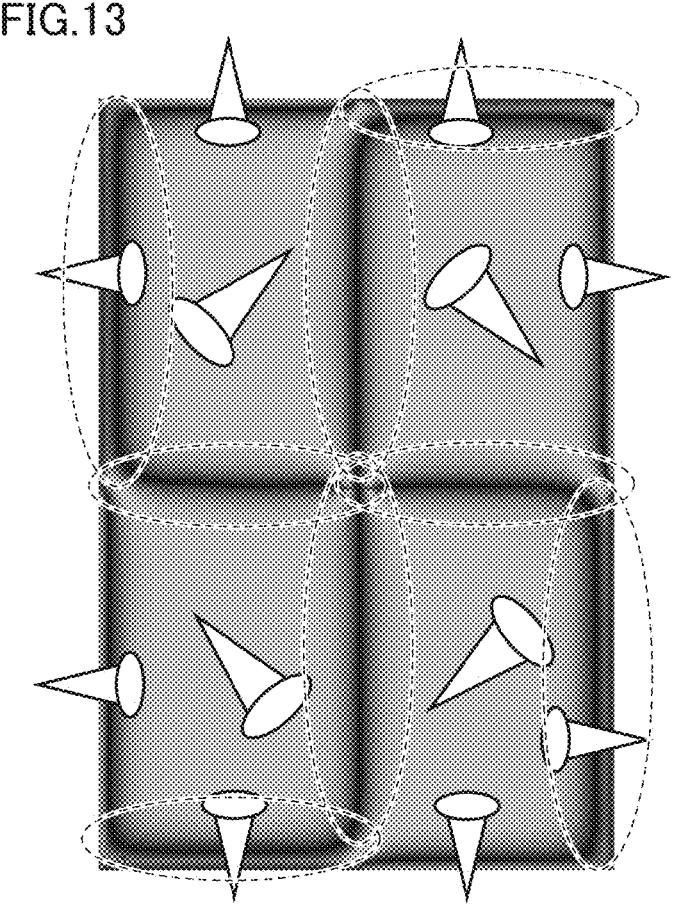
FIG. 13 is a diagram showing the result of a simulation of a dark line on which symbols representing liquid crystal molecules in one pixel are superimposed.

FIG. 13 shows the result of a simulation of a dark line on which symbols representing liquid crystal molecules are superimposed. In FIG. 13, a dark line occurs in each section surrounded by an ellipse indicated by a dash line.

The inventors of the present invention have made earnest efforts to consequently achieve the present invention for suppressing occurrence of a dark line which is generated on the above-described principle.

First Embodiment

Figure 14:
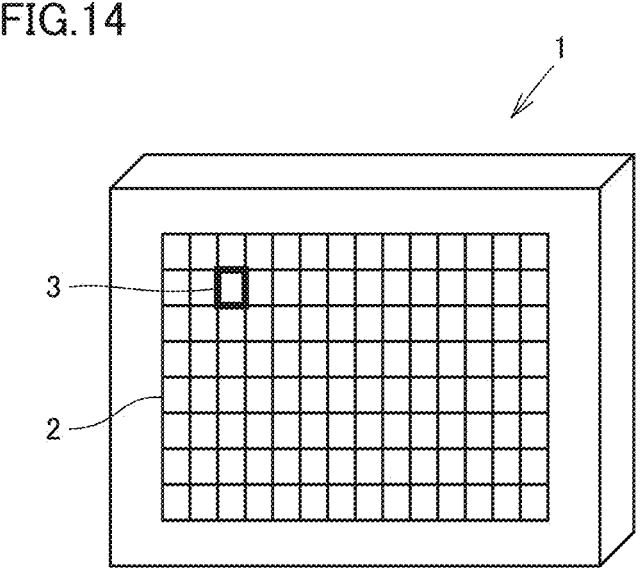
FIG. 14 is a perspective view of a liquid crystal display device according to a first embodiment based on the present invention.
Figure 15:
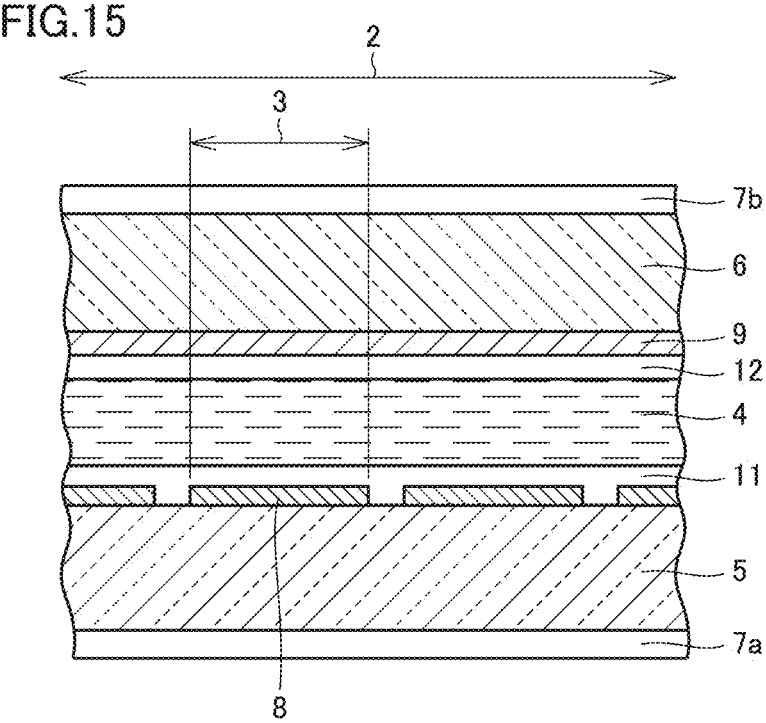
FIG. 15 is a fragmentary cross-sectional view of the liquid crystal display device according to the first embodiment based on the present invention.
Figure 16:
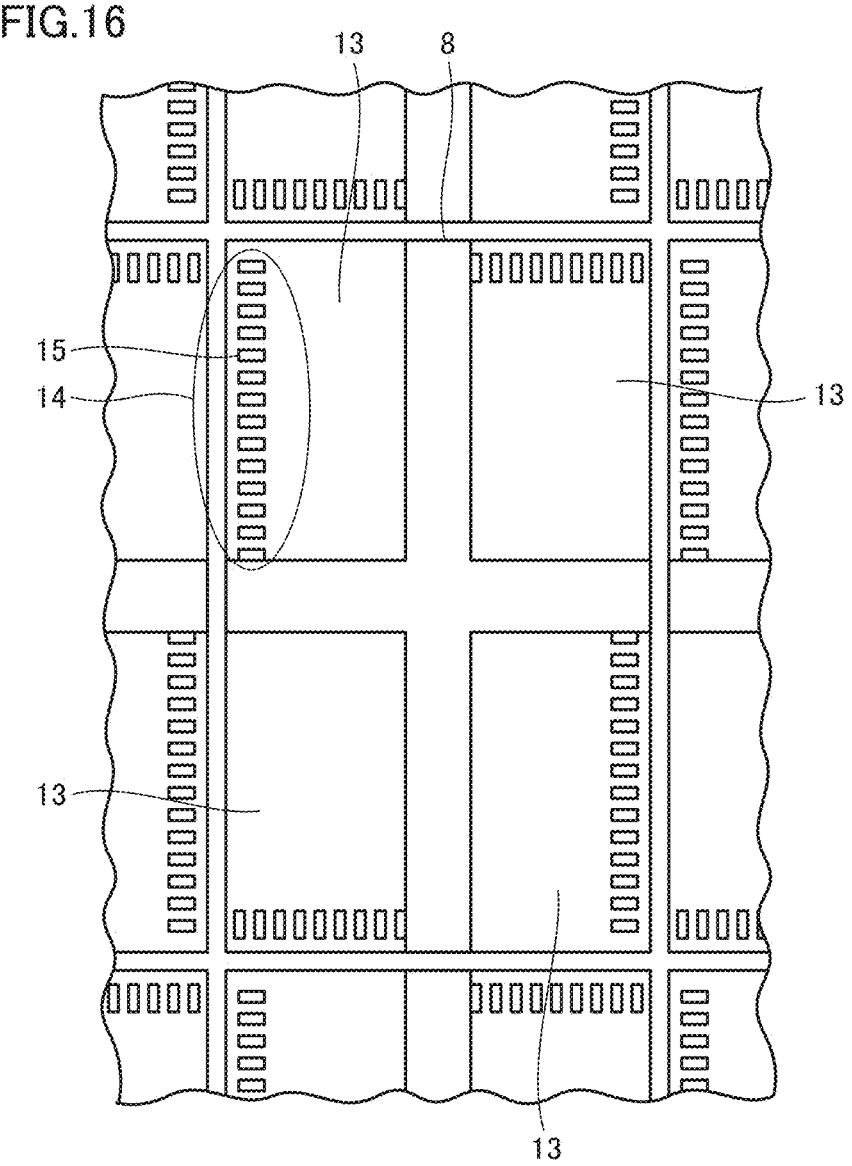
FIG. 16 is a partial enlarged plan view of the liquid crystal display device according to the first embodiment based on the present invention.

Referring to FIGS. 14 to 17, a liquid crystal display device according to a first embodiment based on the present invention will be described. As shown in FIG. 14, liquid crystal display device 1 in the present embodiment has a display region 2 including a plurality of pixels 3. As shown in FIG. 15, liquid crystal display device 1 includes: a liquid crystal layer 4 extending at least in display region 2; a TFT substrate 5 and a CF substrate 6 as the first substrate and the second substrate, respectively, that are affixed to each other so as to sandwich liquid crystal layer 4 therebetween; and a pair of polarization plates 7a and 7b arranged so as to sandwich the first and second substrates therebetween. TFT substrate 5 serving as the first substrate is provided with a pixel electrode 8 corresponding to each of the plurality of pixels 3. CF substrate 6 serving as the second substrate is provided with a counter electrode 9 so as to face pixel electrode 8. A first alignment film 11 is disposed on a surface of pixel electrode 8, the surface being a surface facing liquid crystal layer 4. A second alignment film 12 is disposed on a surface of counter electrode 9, the surface being a surface facing liquid crystal layer 4. In FIG. 15, the structures such as a TFT, an interconnection and a contact hole are not shown for convenience of explanation. As shown in FIG. 16, pixel 3 includes a plurality of domains 13 having different combinations of alignment directions of the first and second alignment films 11, 12.

Pixel electrode 8 has a slit group 14 along at least a part of the outline of the pixel electrode and in the vicinity of this outline. Slit group 14 is a collection of a plurality of slits 15.

Figure 17:
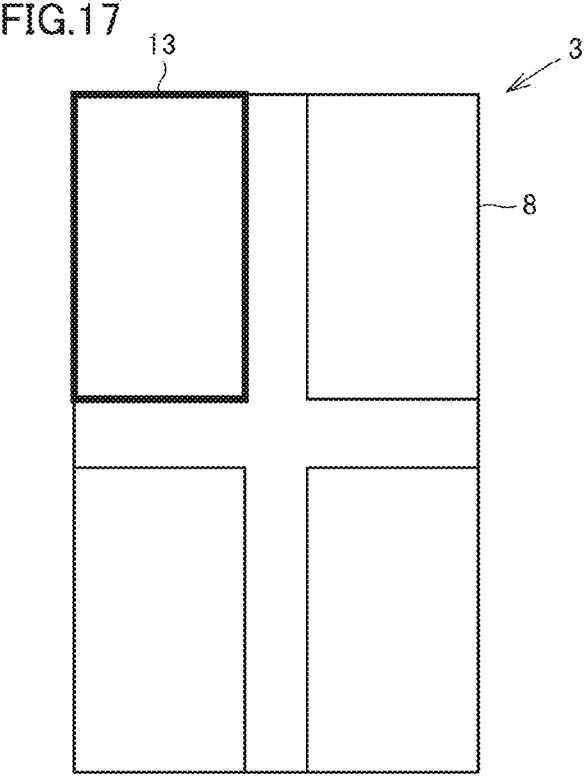
FIG. 17 is an explanatory diagram illustrating a two-dimensional positional relationship between a pixel and domains.

Here, in order to explain the two-dimensional positional relationship between pixel 3 and domains 13, reference is made to FIG. 17. On the surface of TFT substrate 5, pixel electrode 8 is disposed as an electrode of the size corresponding to the size of pixel 3. Pixel 3 is conceptually a two-dimensional geometric region and a pixel electrode 8 is a member serving as an electrode disposed to substantially cover pixel 3. In the following description, one pixel 3 is an oblong rectangle, which, however is merely given by way of example, and the pixel may theoretically be of another shape. In the present embodiment, four domains 13 are included in pixel 3. The domains are different from each other in terms of the combination of respective alignment directions of first and second alignment films 11, 12. In other words, any two domains selected from a plurality of domains within one pixel 3 do not match each other in terms of the combination of respective alignment directions of first and second alignment films 11, 12. In the example shown in FIGS. 16 and 17, there are four domains within one pixel 3 and the domains have respective combinations of alignment directions that are different from each other. Therefore, there are four possible combinations of the alignment directions per one pixel.

While the example is given here where four domains are formed in one pixel 3, the number of domains provided in one pixel may either be larger or smaller than four.

Figure 18:
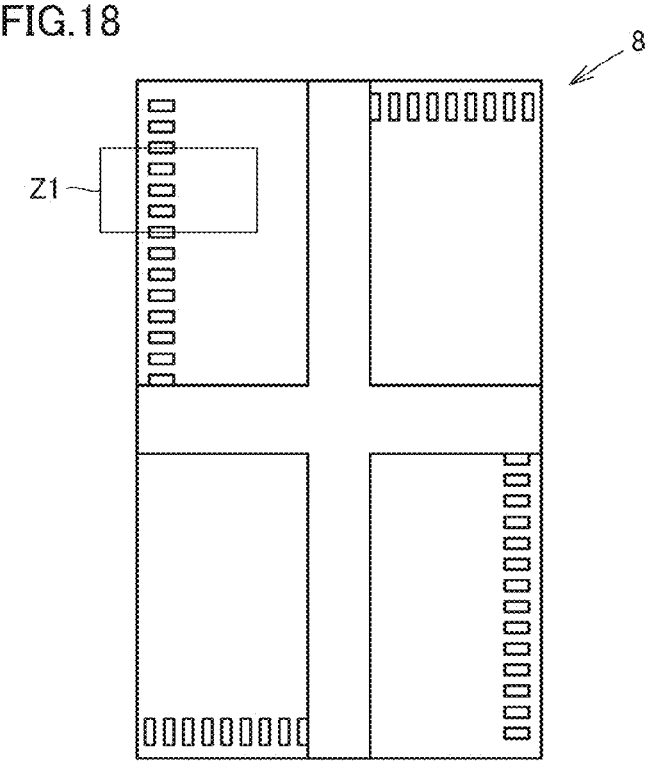
FIG. 18 is a plan view of one pixel.
Figure 19:
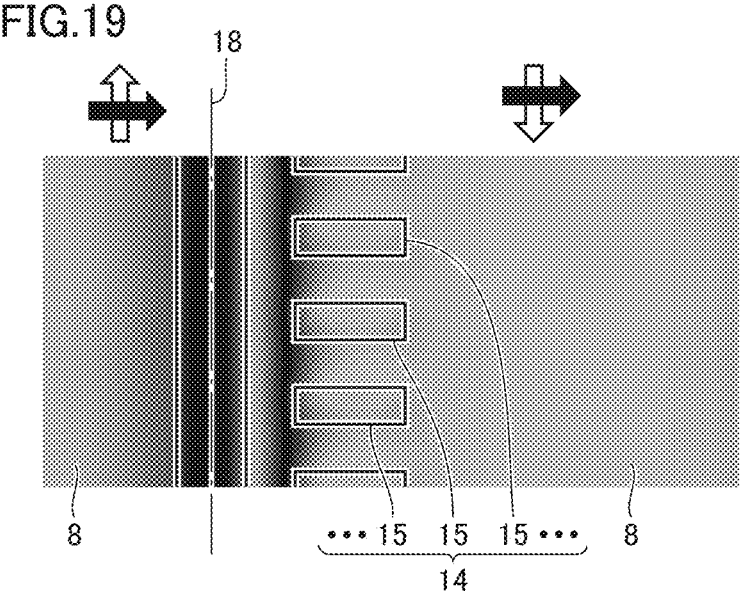
FIG. 19 illustrates the result of a simulation of occurrence of a dark line in a region Z1 of FIG. 18.
Figure 20:
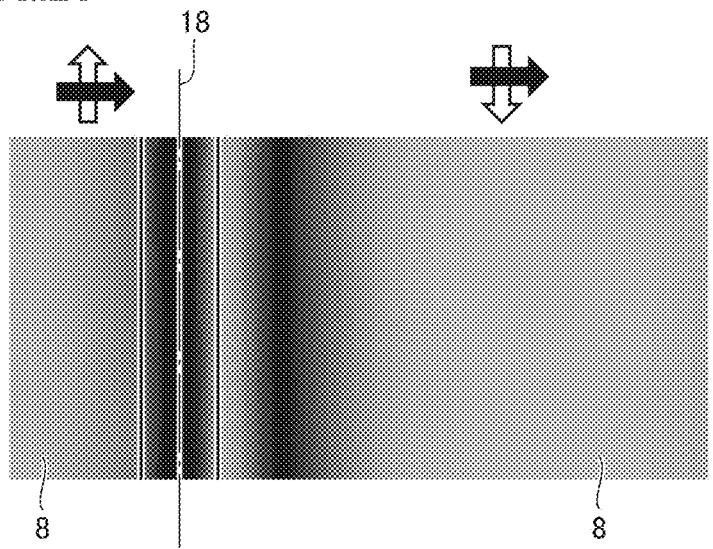
FIG. 20 illustrates the result of a simulation of occurrence of a dark line in the same region where no slit group is provided.

The liquid crystal display device in the present embodiment has slit group 14 along at least a part of the outline of pixel electrode 8 and in the vicinity of this outline to thereby suppress dark lines. The result of a simulation of dark-line generation in a region Z1 shown in FIG. 18 is shown in FIG. 19. The result of a simulation of dark-line generation in the same region where slit group 14 is absent is shown in FIG. 20. In FIGS. 19 and 20, the blank arrows each indicate the alignment direction of an alignment film provided on the surface of TFT substrate 5 which is the first substrate, namely first alignment film 11, and the black arrows each indicate the alignment direction of the alignment film provided on the surface of CF substrate 6 which is the second substrate, namely second alignment film 12. In these simulations, the pixel electrode is a so-called wholly solid structure, namely has the shape of a simple rectangular plate, and the tilt angle of liquid crystal molecules is 88.2°. The inventors have already confirmed that a result similar to the simulation result can be derived from an actually-manufactured prototype of the liquid crystal display device.

It is seen from a comparison between FIG. 19 and FIG. 20 that the region where a dark line is generated is apparently narrower in FIG. 19 than that in FIG. 20. Thus, the liquid crystal display device in the present embodiment can suppress the phenomenon where a dark line is generated on a part of the outline of a pixel in the liquid crystal display device having a plurality of domains.

Figure 21:
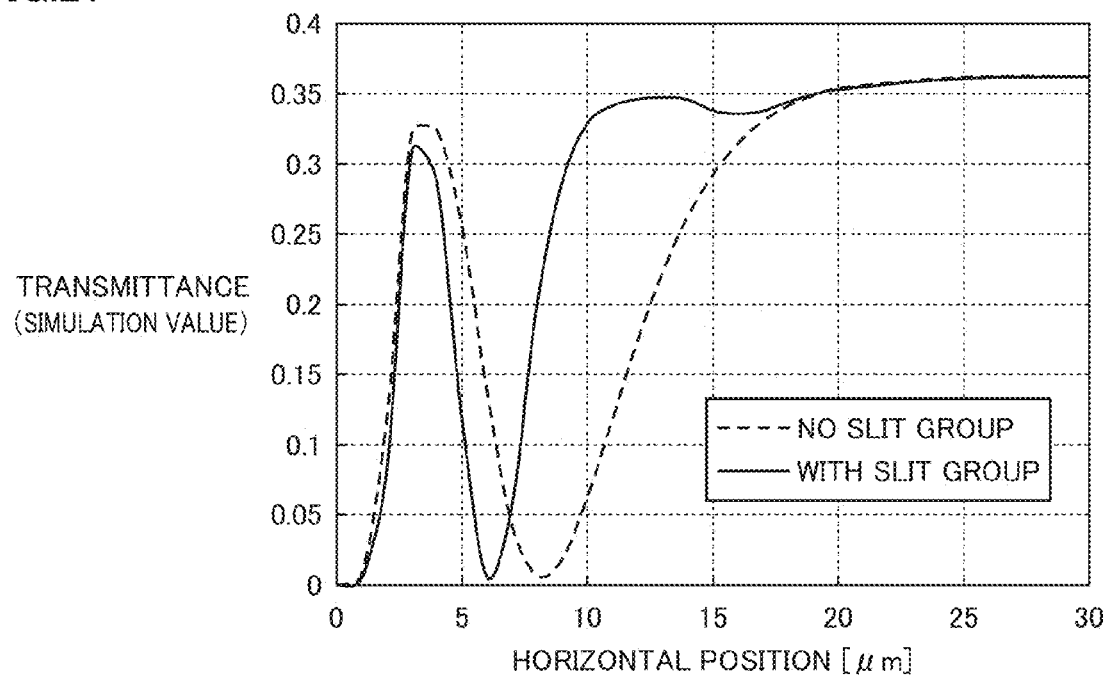
FIG. 21 shows a graph of the transmittance where a slit group is present and the transmittance where a slit group is absent.

A graph plotting the transmittance is shown in FIG. 21. In FIG. 21, "horizontal position" on the horizontal axis is a position with respect to the position "0" of an inter-pixel middle line 18, and the positions inside pixel electrode 8, namely the right side in FIGS. 19 and 20, are represented by positive values. "Inter-pixel middle line" is the central line in the gap between pixel electrodes 8. In FIGS. 19 and 20, inter-pixel middle line 18 is expressed by an alternate long and short dash line. In FIG. 21, "transmittance" on the vertical axis is the transmittance of light at the corresponding position. A region where the dark line is generated has a lower transmittance. It is seen from the graph of FIG. 21 that a slit group provided in accordance with the present invention reduces the width of the dark line relative to that of the pixel electrode without slit group. According to the results of the simulations, the transmittance where no slit group is provided is 0.263 and the transmittance where a slit group is provided is 0.303. Thus, the improvement made by the presence of the slit group is 1.15.

Figure 22:
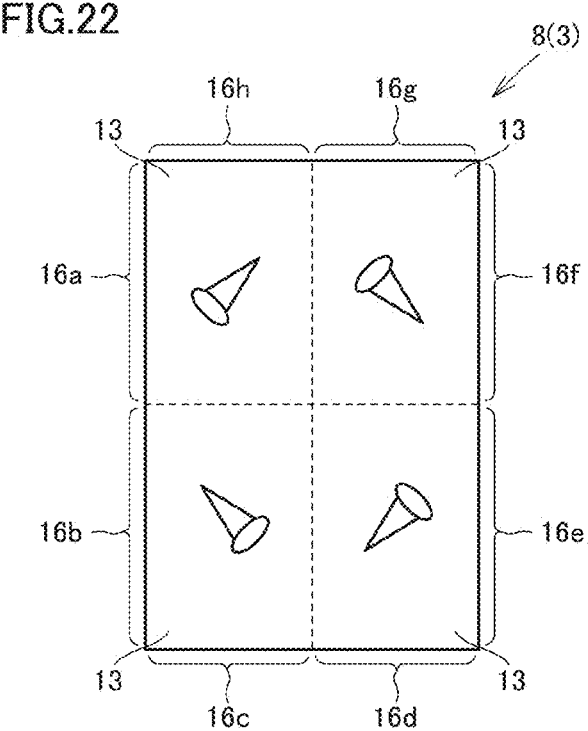
FIG. 22 is an explanatory diagram illustrating a relationship between the posture of liquid crystal molecules and domain sides.

In the present embodiment, of all sides of respective outlines of the plurality of domains, "domain sides" are herein the sides constituting the outline of the pixel electrode. In this case, it is preferable that slit group 14 is provided along a domain side toward which an end of a liquid crystal molecule is directed, where the end of the liquid crystal molecule is an end thereof oriented toward the second substrate, by first alignment film 11 and second alignment film 12, in a central region along the thickness direction of liquid crystal layer 4. By way of example, pixel 3 includes four domains 13 and the outline of pixel 3 includes eight domain sides 16a to 16h as shown in FIG. 22. Respective ends, which are oriented toward the second substrate in a central region along the thickness direction of liquid crystal layer 4 by first alignment film 11 and second alignment film 12, of the liquid crystal molecules are directed toward domain sides 16a, 16c, 16e, and 16g as shown in FIG. 22. In the present embodiment, slit group 14 is disposed so that this condition is satisfied. Namely, slit groups 14 are disposed in the manner shown in FIG. 16. In this way, slit groups can be provided solely on the regions where dark lines will be generated unless slit groups are provided, to thereby efficiently suppress generation of dark lines.

Figure 23:
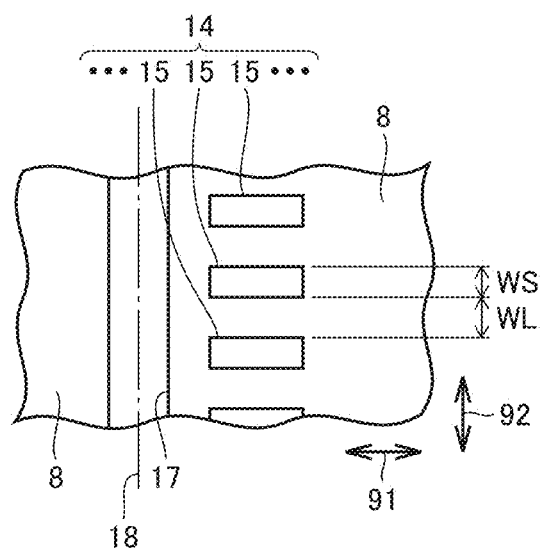
FIG. 23 is an explanatory diagram illustrating a line portion and a space portion of a pixel electrode.

In the present embodiment, it is preferable as shown in FIG. 23 that slit group 14 is a plurality of linear slits 15 which each extend along a direction 91 perpendicular to a closest part of outline 17 of pixel electrode 8 and are arranged along a direction 92 parallel to the closest part of outline 17. In the present embodiment, slit group 14 is disposed so that this condition is satisfied. In this way, generation of dark lines can efficiently be suppressed. The relationship between the direction along which the slits extend and the effect of suppressing dark lines will be described later herein together with experimental results.

As shown in FIG. 23, the slit group includes a line portion, namely the portion where the pixel electrode is present, having a width indicated by WL, and the slit group includes a space portion, namely the portion where the pixel electrode is absent, having a width indicated by WS. The simulation of dark-line generation was done under the conditions of WL=4 µm and WS=3 µm.

Comparative Experiment on Conditions of Slits

The inventors conducted experiments in order to find optimum conditions for the direction along which each slit 15 included in slit group 14 extends and the size of the slit. These experiments will be described below in conjunction with second and third embodiments.

Figure 24:
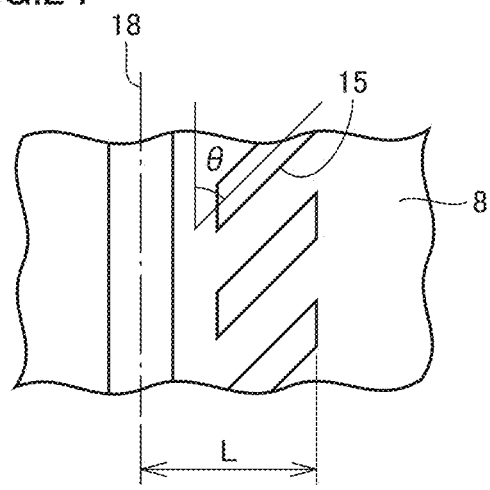
FIG. 24 is an explanatory diagram illustrating how the slit angle and the slit depth are defined.
Figure 25:
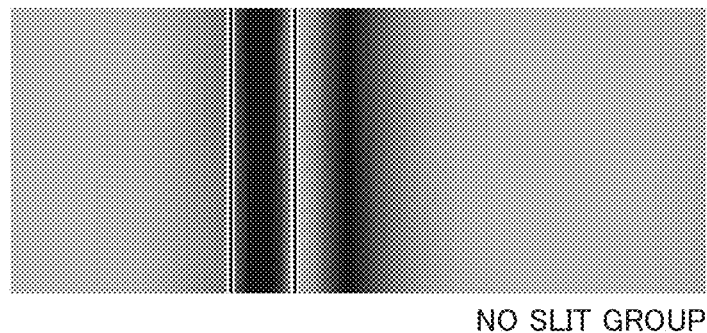
FIG. 25 shows an image of the result of a simulation where slits are absent.

As shown in FIG. 24, an angle θ between the outline of pixel electrode 8 and slit 15 is herein referred to as "slit angle" and a distance L between the inter-pixel middle line and one of the ends of the slit that is located relatively further from the inter-pixel middle line is herein referred to as "slit depth." By way of comparison, the result of a simulation where no slit is provided is shown in FIG. 25.

Second Embodiment

Experiment on Slit Angle

Figure 26:
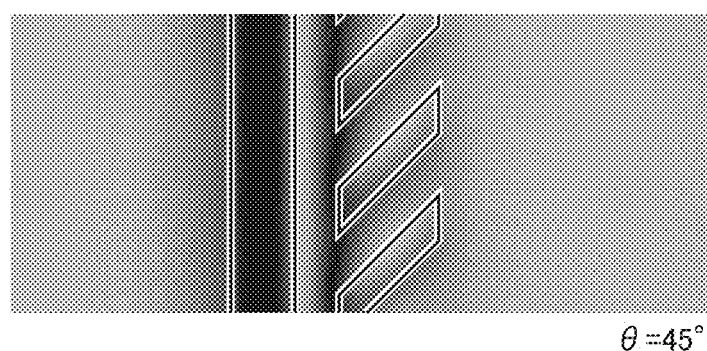
FIG. 26 shows an image of the result of a simulation where the slit angle is 45° according to a second embodiment based on the present invention.
Figure 27:
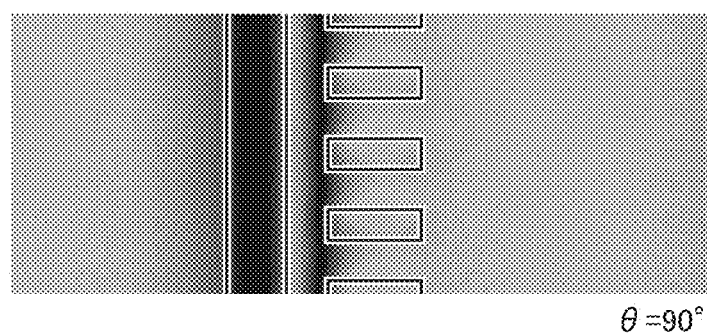
FIG. 27 shows an image of the result of a simulation where the slit angle is 90° according to the second embodiment based on the present invention.
Figure 28:
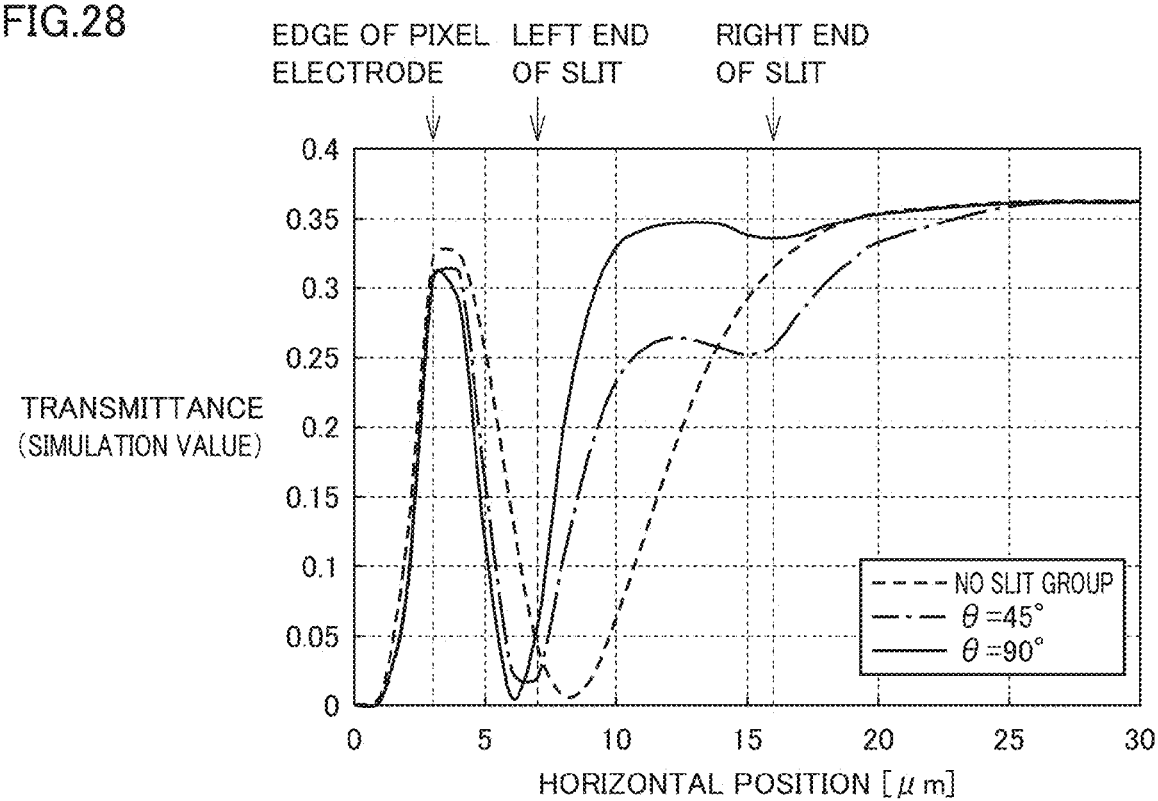
FIG. 28 shows a graph of the transmittance where different slit angles are defined according to the second embodiment based on the present invention.

The results of simulations where slit depth L is 16 µm and respective slit angles θ are 45° and 90° are shown in FIGS. 26 and 27, respectively. The transmittance obtained from the simulation results and plotted in a graph is shown in FIG. 28. It is apparent, from both the images and the graph obtained from the simulation results, the slit angle θ of 90° provides a thinner dark line relative to the slit angle θ of 45°. The inventors have examined the results to reach a conclusion that the transmittance is at its maximum under the condition that slit angle θ is 90° if the slit depth is unchanged.

Third Embodiment

Experiment on Slit Depth

Figure 29:
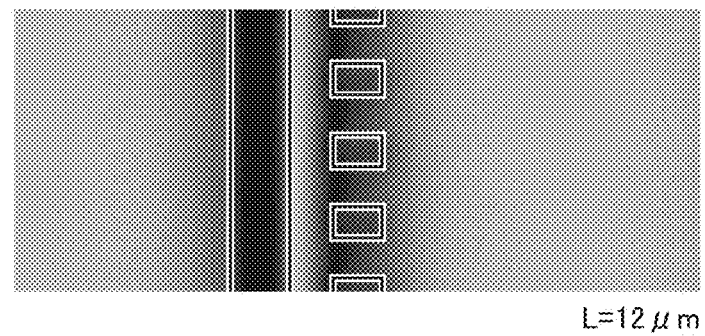
FIG. 29 shows an image of the result of a simulation where the slit depth is 12 μm according to a third embodiment based on the present invention.
Figure 30:
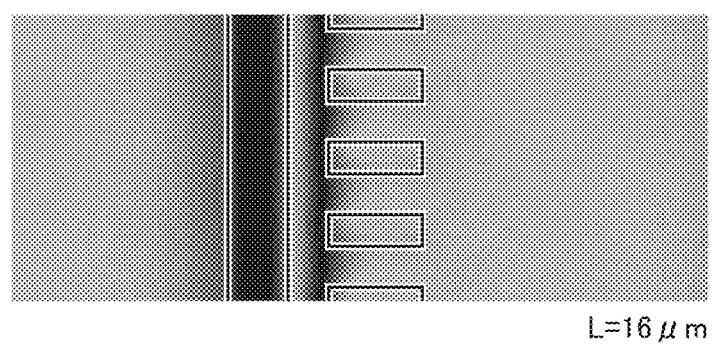
FIG. 30 shows an image of the result of a simulation where the slit depth is 16 μm according to the third embodiment based on the present invention.
Figure 31:
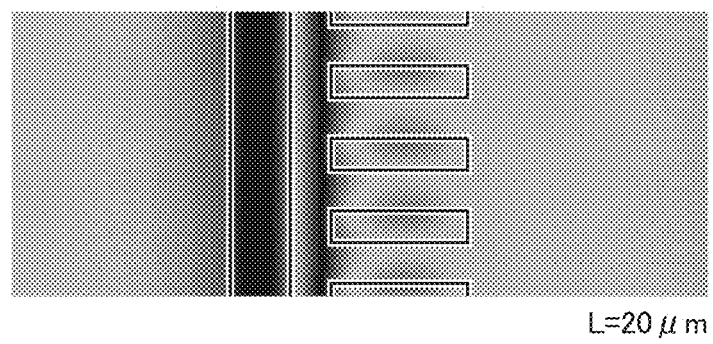
FIG. 31 shows an image of the result of a simulation where the slit depth is 20 μm according to the third embodiment based on the present invention.
Figure 32:
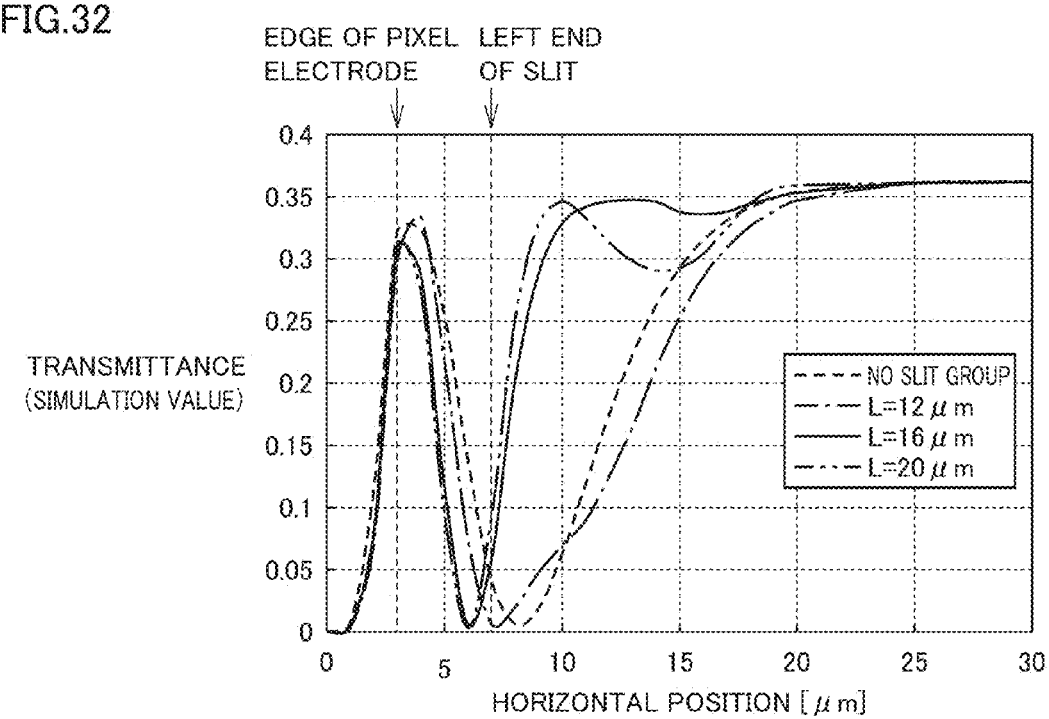
FIG. 32 shows a graph of the transmittance where different slit depths are defined according to the third embodiment based on the present invention.

The results of simulations where slit angle θ is 90° and respective slit depths L are 12 µm, 16 µm, and 20 µm are shown in FIGS. 29, 30, and 31, respectively. The transmittance obtained from the simulation results and plotted in a graph is shown in FIG. 32. It has been found, from the images and the graph obtained from the simulation results, the slit depth L=12 mm cannot be regarded as making an improvement even relative to FIG. 25 showing the result where no slit group is provided, and rather increases the width of the dark line. It has been found that the slit depth L=20 µm results in a short dark portion along the longer side of slit 15, which results in a decrease of the transmittance. The inventors have examined the results to reach a conclusion that the transmittance is at its maximum under the condition that slit depth L is 16 µm if the slit angle is unchanged.

Under the condition that slit depth L is 16 µm, one of the ends of slit 15 that is relatively further from an edge of pixel electrode 8 is located at the same position as the position of one of the ends of a dark line that is relatively further from the edge of pixel electrode 8, the dark line being generated under the condition that slit group 14 is absent. The inventors have examined the results to find that the length of the slits is preferably defined so that this condition is satisfied. In other words, it is preferable that one of the ends of slit 15 that is relatively further from an edge of pixel electrode 8 is located at the same position as the position of one of the ends of a dark line that is relatively further from the edge of pixel electrode 8, the dark line being generated under the condition that no slit group 14 is provided. This arrangement can be adopted to efficiently suppress dark lines.

Preferably, pixel 3 is rectangular, a plurality of domains 13 are four domains 13 in total arranged inside pixel 3 with two domains along a lengthwise direction and two domains along a widthwise direction and, in each domain 13, slit group 14 is provided along one of two sides that form a part of the outline of this domain 13 and also form a part of the outline of pixel 3. In this way, generation of dark lines can efficiently be suppressed. Preferably, the slit group is absent along the other of the aforementioned two sides. Thus, the slit group can be provided solely along the necessary part of the outline of the pixel, and therefore, generation of dark lines can efficiently be suppressed.

According to the above description of each embodiment, the alignment film has its specific alignment direction defined by exposure. The alignment direction of the alignment film, however, may be defined in any way other than exposure.

It should be construed that the above embodiments disclosed herein are by way of illustration in all respects, not by way of limitation. The scope of the present invention is defined by claims, not by the description above, and encompasses all modifications and variations equivalent in meaning and scope to the claims.

Industrial Applicability

The present invention is applicable to a liquid crystal display device.

REFERENCE SIGNS LIST

1 liquid crystal display device; 2 display region; 3 pixel; 4 liquid crystal layer; 5 TFT substrate; 6 CF substrate; 7a, 7b polarization plate; 8 pixel electrode; 9 counter electrode; 11 first alignment film; 12 second alignment film; 13 domain; 14 slit group; 15 slit; 16a-16h domain side; 17 outline (of pixel electrode), 18 inter-pixel middle line; 91, 92 direction

The invention claimed is:

1. A liquid crystal display device having a display region including a plurality of pixels, comprising:
   a liquid crystal layer extending at least in said display region;
   first and second substrates affixed to each other so as to sandwich said liquid crystal layer therebetween; and
   a pair of polarization plates disposed so as to sandwich said first and second substrates therebetween,
   said first substrate being provided with a pixel electrode corresponding to each of said plurality of pixels,
   said second substrate being provided with a counter electrode so as to face said pixel electrode,
   a first alignment film being disposed on a surface of said pixel electrode, said surface being a surface facing said liquid crystal layer,
   a second alignment film disposed on a surface of said counter electrode, said surface being a surface facing said liquid crystal layer,
   said pixels each including a plurality of domains having different combinations of alignment directions of said first and second alignment films,
   said pixel electrode having a slit group along at least a part of an outline of said pixel electrode and in the vicinity of said outline, and
   of all sides of respective outlines of said plurality of domains, sides constituting the outline of said pixel electrode are domain sides, and said slit group is provided along said domain side toward which an end of a liquid crystal molecule is directed, said end of the liquid crystal molecule being an end thereof oriented toward said second substrate, by said first alignment film and said second alignment film, in a central region along a thickness direction of said liquid crystal layer.

2. The liquid crystal display device according to claim 1, wherein
   said slit group is a plurality of linear slits each extending along a direction perpendicular to a closest part of the outline of said pixel electrode and arranged along a direction parallel to said closest part of the outline.

3. The liquid crystal display device according to claim 2, wherein
   one of ends of said slit that is relatively further from an edge of said pixel electrode is located at the same position as the position of one of ends of a dark line that is relatively further from the edge of said pixel electrode, said dark line being generated in a case where said slit group is absent.

4. The liquid crystal display device according to claim 1, wherein
   said pixel is rectangular, said plurality of domains are four domains in total arranged inside said pixel with two domains along a lengthwise direction and two domains along a widthwise direction and, in each said domain, said slit group is provided along one of two sides that form a part of an outline of said domain and also form a part of an outline of said pixel.

5. The liquid crystal display device according to claim 4, wherein said slit group is absent along the other of said two sides.

* * * * *